United States Patent Office
2,813,091
Patented Nov. 12, 1957

2,813,091

AMIDE CONDENSATION PRODUCTS

John D. Zech, Wilmington, Del., assignor to Atlas Powder Company, Wilmington, Del., a corporation of Delaware No Drawing. Application May 4, 1953,
Serial No. 353,005

7 Claims. (Cl. 260—211)

The present invention relates to condensation products formed by the interaction of a secondary hexityl amine, formaldehyde and an amide, and to a process for making the same.

In copending application Ser. No. 337,691, filed February 18, 1953, there are disclosed condensation products of hexityl amines with formaldehyde, a phenol and certain polyamides, particularly urea and melamine. This application, which is continuation-in-part of the said copending application, is directed to condensation products of amides in general with formaldehyde and hexityl amines.

It is an object of the invention to provide the named condensation products as new composition.

Another object is to provide a process for making the condensation products.

A specific object is to provide condensation products of N-methyl glucamine, formaldehyde and amides.

The above and other objects will become apparent in the course of the following description.

The products of the invention have novel properties making them suitable for a variety of uses. By reason of their reactive groups they are useful as chemical intermediates. Particular compounds of the class are useful as surface active agents, anti-static agents, textile finishing and processing assistants, corrosion inhibitors, lubricant additives, waxes, or synthetic resins.

The term "hexityl amines" is used herein to define compounds from the group having the structure of hexitols with one hydroxyl group replaced by an amino group. They are the reduction products of hexosamines and are preferably made by the simultaneous reaction of ammonia, or a primary amine, and hydrogen on a hexose by methods well known to the art. Secondary hexityl amines result when the nitrogen containing compound entering the reaction is a primary amine. Among such secondary hexityl amines may be named N-methyl glucamine, N-methyl fructamine, N-ethyl, N-butyl, N-benzyl, N-phenyl, N-cetyl, etc., glucamines, or N-propyl, N-allyl, N-oleyl, N-tolyl, etc., fructamines.

The compounds of the invention are condensation products of secondary hexityl amines with formaldehyde and amides. Amides, suitable for preparation of the novel condensation products, contain at least one reactive amido hydrogen and may be mono-, di- or polyamides. They may be derived from carboxylic acids or sulfonic acids. An exemplifying, but non-limiting, list of amides which may be condensed with secondary hexityl amines and formaldehyde in accordance with the invention is as follows:

Acetamide
Butyramide
Lauramide
Stearamide
Oleic amide
Myristic amide
Palmitic amide
p-Toluene sulfonamide
Phthalimide
Succinimide
Adipic diamide
Azelaic diamide
Oxalic diamide
Behenic amide
Erucic amide
Linoleic amide
Tall oil amide
Rosin amide
Benzoic amide
Benzene sulfonamide
Sebacic diamide
Dilinoleic acid diamide
Urea
Biuret
Melamine When the condensing amide is a monoamide, the products of the invention are those resulting from the reaction of equimolar proportions of secondary hexityl amine, formaldehyde, and amide. The product, then, contains the amido radical linked through methylene to the secondary hexityl amino radical. Condensation products from di- and polyamides are those obtained by employing, per mol of polyamide, from one to $n$ mols of formaldehyde and from 1 to $n$ mols of secondary hexityl amine, where $n$ is the number of amido radicals per mol of polyamide. The products thus contain one or more hexityl amino radicals linked through methylene groups to polyamido residues which may or may not contain free methylol groups and unreacted amido radicals.

In preparing the condensation products the formaldehyde may be introduced into the reaction mixture in the form of aqueous or alcoholic solutions, or in the form of a polymer such as a paraformaldehyde.

The condensation may be carried out in a single stage or stepwise. Most simply the amine, amide, and formaldehyde are dissolved in a suitable solvent, such, for example, as water or alcohol, refluxed for several hours and recovered from the solvent by distilling off the latter. Alternatively, the amide may be first reacted with formaldehyde to form a methylol amide, which then may be further condensed with a hexityl amine. The stepwise procedure is especially satisfactory when a polyamide is being condensed with fewer mols of hexityl amine than the number of amide radicals. The following examples illustrate the preparation of specific condensation products in accordance with the invention.

*Example 1*

493 grams of N-methyl glucamine and 505 grams of a commercial lauric amide (Armour's Armid 12) were dissolved in 1750 ml. of methanol, and 75 grams of paraformaldehyde added. The mixture was heated for two hours under a reflux condenser, after which time the methanol and water of reaction were removed by distillation. Distillation was conducted at first under atmosphere pressure and finally under high vacuum (1 to 2 millimeters of mercury) at a maximum temperature of 120 to 125° C. The condensation product remaining in the pot was a firm waxy product of pronounced surface activity.

*Example 2*

To a solution of 395 grams of N-methyl glucamine and 566 grams of a commercial stearic amide (Armour's Armid HT) in 2000 ml. of methanol, 60 grams of paraformaldehyde was added. The solution was heated to boiling and refluxed for 2 hours and 20 minutes. The condenser was reversed and solvent removed by distillation, first at atmospheric pressure and finally under vacuum at a maximum temperature of 120° to 125° C. The condensation product remaining in the flask was a hard waxy solid.

*Example 3*

199 grams of N-methyl glucamine, 281 grams of commercial oleic amide and 30 grams of paraformaldehyde were dissolved in 1030 ml. of methanol. The mixture was heated to boiling and refluxed for two hours. Solvent was removed as in the preceding examples. The still residue was a soft wax comprising the radicals of N- methyl glucamine and oleic amide, linked by their respective nitrogen atoms through a methylene bridge.

Example 4

A resinous condensation product was obtained by refluxing together for 1.5 hours a solution of 30.5 grams of urea, 200 grams of N-methyl glucamine and 82 grams of 37% formalin in 100 ml. of water. The resin was recovered from the solution by distilling off the water under vacuum.

Example 5

A resinous condensation product was prepared from melamine, formaldehyde, and N-methyl glucamine as follows: 68.5 grams of melamine, 33 grams of paraformaldehyde and 212 grams of N-methyl glucamine, all dissolved in 200 ml. of water were heated to boiling in a reaction flask and held at a temperature of from 80° to 103° C. under reflux conditions. After 2½ hours reaction time, 20 cc. of 37% aqueous formaldehyde was added and heating continued. After 4⅔ hours reaction time a second portion of 20 cc. of 37% formaldehyde solution was added. After 5⅔ hours reaction time the water was distilled from the solution and the product cooled to a brittle glassy resin. Per mol of melamine, there was employed 2 mols of N-methyl glucamine and 3 mols of formaldehyde.

Example 6

A highly hydrophilic condensation product was prepared by refluxing together for one hour at 90° to 103° C., 118 grams of acetamide, 390 grams of N-methyl glucamine, and 170 grams of 37% aqueous formaldehyde solution, all diluted with 60 ml. of water. From the reaction mixture 105 ml. of water was distilled off, leaving a viscous syrup of 84% solids content comprising N-methyl, N-acetamidomethyl glucamine.

Example 7

45 grams of paraformaldehyde, 60 grams of urea and 293 grams of N-methyl glucamine were dissolved in 100 ml. of water and heated for 38 minutes under reflux conditions at 82° to 96° C. 65 ml. of water was distilled from the reaction mixture, leaving a viscous syrup of 86.5% solids content. Like the product of Example 6 this condensation product is water-soluble and highly hydrophilic.

Example 8

A water-soluble urea condensation product containing free methylol groups was prepared by refluxing together for 36 minutes the following ingredients:

30 grams urea
22.5 grams paraformaldehyde
97.5 grams N-methyl glucamine
100 ml. water The cooled solution possessed no odor of formaldehyde, showing that the reaction had gone to completion.

Example 9

24.3 grams of N-methyl glucamine, 18.3 grams of phthalimide, and 3.75 grams of paraformaldehyde, all dissolved in 150 ml. of methanol were refluxed for 72 minutes at 66° to 69° C. The methanol was distilled off to yield a resinous product which was N-phthalimidomethyl, N-methyl glucamine.

Properties of condensation products made in accordance with the invention may vary over a wide range depending upon the choice of amine and amide. In the absence of any radical of substantial hydrocarbon content (the products of Examples 6, 7, and 8, for example), the products are water-soluble and hydrophilic. They may be employed as hygroscopic conditioning agents in glue formulations, in paper or cellophane, and the like, or caused to react with polybasic acids, such as boric acid, to yield resinous film formers.

The introduction of one or more high molecular weight hydrocarbon radicals into the compound, as by employing N-cetyl glucamine, or stearic amide, or both in the condensation, increases the hydrophobic character thereof and decreases the water solubility. The condensates containing both the hydrophilic glucamine residues and hydrophobic radicals are strongly surface active.

The condensation products of the invention contain functional groups which are chemically reactive. They serve, therefore, as intermediates for the synthesis of many derivatives. The hydroxyl radicals of the glucamine residue may be esterified with organic or inorganic acid, etherified to replace the hydroxyl groups with alkoxy groups, aryloxy groups, and the like, or condensed with alkylene oxides to yield hydroxy alkyl ethers or polyglycol ethers. The tertiary nitrogen atoms of the condensates are susceptible of quaternization in the usual manner and, when so treated, the condensates exhibit strong, cationic surface activity.

Polyamides, condensed with hexityl amines in accordance with the invention, tend to yield resinous condensation products, particularly if more than one mol of formaldehyde is employed per amido radical.

The following example illustrates the condensation of an amide other than a carboxylic amide in accordance with the invention.

Example 10

85.5 grams of p-toluene sulfonamide, 97.5 grams of methyl glucamine, 15 grams of paraformaldehyde and 350 cc. of methanol were heated together at reflux temperature for 2⅓ hours, after which the methanol was distilled off using vacuum at the end. The maximum temperature reached was 114° C. The residue amounting to 188 grams was a light amber-colored viscous liquid while hot. After cooling to room temperature it was a soft taffy-like material which crystallized slowly.

From the several detailed examples given, those skilled in the art will readily perceive how to prepare analogous condensation products from formaldehyde and the numerous amines and amides described hereinbefore.

What is claimed is:

1. The process which comprises heating together equimolar proportions of a secondary hexityl amine, formaldehyde and a monocarboxylic fatty acid amide in the presence of a mutual solvent and subsequently recovering the resultant condensation product from the solvent.

2. The process of claim 1 wherein the said amine is N-methyl glucamine and the said amide is lauric amide.

3. The process of claim 1 wherein the said amine is N-methyl glucamine and the said amide is stearic amide.

4. An N-substituted monocarboxylic fatty acid amide wherein the nitrogen of a secondary hexityl amino radical is linked through methylene to the nitrogen atom of said amide.

5. An N-substituted monocarboxylic fatty acid amide wherein the nitrogen of an N-alkyl glucamine is linked through methylene to the nitrogen atom of said amide.

6. N-methyl, N-lauramido methyl glucamine.

7. N-methyl, N-stearamido methyl glucamine.

References Cited in the file of this patent

UNITED STATES PATENTS

| | | |
|---|---|---|
| 2,216,617 | Katz | Oct. 1, 1940 |
| 2,317,181 | D'Alelio | Apr. 20, 1943 |
| 2,573,489 | Rheiner et al. | Oct. 30, 1951 |
| 2,653,932 | Schwartz | Sept. 29, 1953 |

(Filed Oct. 20, 1949)

OTHER REFERENCES

Degering: "An Outline of Organic Nitrogen Compounds," published by University Lithoprinter (Ypsilanti, Michigan) 1953 (pages 216 to 217 relied on).